United States Patent [19]

Heitmann et al.

[11] Patent Number: 5,707,909
[45] Date of Patent: Jan. 13, 1998

[54] LEAD-FREE GLASS COMPOSITION AND ITS USE

[75] Inventors: Oliver Heitmann, Mannheim; Gerhard Tünker, Offenbach, both of Germany

[73] Assignee: Cerdec Aktiengesellschaft Keramische Farben, Frankfurt, Germany

[21] Appl. No.: 604,395

[22] Filed: Feb. 21, 1996

[30] Foreign Application Priority Data

Feb. 22, 1995 [DE] Germany ............... 195 06 123.3

[51] Int. Cl.$^6$ ................................................ C03C 3/118
[52] U.S. Cl. ................................. 501/59; 501/67; 501/69; 501/72
[58] Field of Search ........................ 501/59, 67, 69, 501/72

[56] References Cited

U.S. PATENT DOCUMENTS

| | | | |
|---|---|---|---|
| 4,312,951 | 1/1982 | Eppler | 501/59 |
| 4,367,012 | 1/1983 | Ikeda et al. | 501/67 |
| 4,376,169 | 3/1983 | Eppler | 501/59 |
| 4,859,637 | 8/1989 | Roberts | 501/67 |
| 4,970,178 | 11/1990 | Klimas et al. | 501/67 |
| 5,292,690 | 3/1994 | Kawachi et al. | 501/67 |
| 5,296,415 | 3/1994 | Podestá | 501/67 |
| 5,330,939 | 7/1994 | Marazzi et al. | 501/67 |
| 5,342,810 | 8/1994 | Merigaud et al. | 501/26 |

FOREIGN PATENT DOCUMENTS

| | | |
|---|---|---|
| 0 025 187 | 3/1981 | European Pat. Off. . |
| 0 086 109 | 8/1983 | European Pat. Off. . |
| 0267154 | 5/1988 | European Pat. Off. . |
| 370683 A1 | 11/1989 | European Pat. Off. ........... C03C 8/02 |
| 558942 A1 | 2/1993 | European Pat. Off. ........... C03C 8/04 |
| 56-155040 | 12/1981 | Japan . |
| 0743960 | 6/1980 | U.S.S.R. . |

OTHER PUBLICATIONS

Nippon Frit KK, Database WWPI, Section CH, Week 8629, Derwent Publications Ltd., London, Great Britain Ckass L01 AN 86–185359 JP–A–61 117 132 Jun. 1986.

*Primary Examiner*—Deborah Jones
*Attorney, Agent, or Firm*—Wenderoth, Lind & Ponack

[57] ABSTRACT

The invention pertains to a new lead-free glass composition with improved properties, a glass frit of this composition and its use for the production of glass-enamel, particularly for architectural glass.

The glass composition contains in mole %:

| | |
|---|---|
| $Na_2O$ | 10–15 |
| $K_2O$ | 0.1–2 |
| $SiO_2$ | 40–50 |
| $B_2O_3$ | 8–12 |
| $TiO_2$ | 4–7 |
| $Al_2O_3$ | 0.1–3 |
| ZnO | 13–17 |
| F | 1–5 | and less than 0.5 weight % each of the oxides of the series PbO, CdO, $P_2O_5$, and alkaline earth metal oxides. Use of a dye preparation containing the glass frit at 600° to 650° C. results in bakeable glazed, crack-free, acid and base resistant enamel layers.

7 Claims, No Drawings

LEAD-FREE GLASS COMPOSITION AND ITS USE

This invention provides a new lead-free glass composition, a glass frit formed from this composition and a process for its manufacture. In a further aspect, the invention provides a dye preparation containing the glass frit according to the invention and its use in the manufacture of enamels for glass, particularly architectural glass plate as well as instrument glass, and other bakeable substrates.

BACKGROUND OF THE INVENTION

In the decoration of glass articles, particularly glass plates, compositions are used, which contain one or more dyeing components and one or more glass frits. The composition is baked on after coating onto the substrate, whereby a glass-enamel is formed. In the application of the composition onto glass plates, the melt behavior of the compositions must be adjusted according to typical conditions of the tempering process. Typical baking conditions are glass temperatures between approximately 600° and 650° C. and bake times of a few minutes. For colorful decoration of glass plates in architectural and instrument glass areas a good compatibility is required between the glass frit contained in the compositions with the inorganic dye pigments.

The requirements of the baked compositions, i.e. of the glass-enamel, in many areas of use are; a smooth run with short baking times at as low a temperature as possible, absolutely no cracks, good chemical resistance against acids and alkaline materials as well as good resistance to weathering. Finally, for economy, if possible no significant amounts of expensive raw material should be contained in the glass frit and for toxicological reasons neither lead nor cadmium should be present.

In practice, different lead- and cadmium-free glass frits and dye preparations containing these are known for various uses, such as the application of glass-enamel on automobile windshields, architectural and instrument glass. Usually, frit systems based on bismuth-alkali-borosilicate glass are used or of an alkali-zinc-borosilicate glass or a mixture thereof.

Known glass frit systems fulfill the above requirements only to a degree: Thus, the lead- and cadmium-free glass frit according to EP-A 0 267 154 is based on a content of $Na_2O$, ZnO, $B_2O_3$, and $SiO_2$ and can contain other oxides such as $Bi_2O_3$, and $Li_2O$. As shown in the examples, only glass frits with a $Bi_2O_3$ or $Li_2O$ content meet the melting region significantly under 650° C. which is required for use on glass. A disadvantage with lithium-containing glass frits is that break resistance is reduced in a glass plate enamelled therewith. In architectural glass plates using dye preparations with Li-containing glass frits, an exchange of Li from the enamel with Na of the glass arises during baking of the glass enamel and tensile stresses and crack formation result.

In EP-A 0 370 683, a glass frit with 45 to 65 weight % $Bi_2O_3$ as well as a dye preparation containing this type of frit is described in the manufacture of glass enamel. The use of such dye preparations lends itself well to the manufacture of enamelled automobile windshields and to the decoration of other glass articles. Glass frits with high bismuth content exhibit low softening points and good melt behavior. However, these frits are much more expensive than low bismuth or non-bismuth glass frits, depending on the bismuth content. Additionally, the glass frit contains 2 to 6 weight % $Li_2O$ according to EP-A 0 370 683, which leads to the weakening of break resistance of the enamelled glass, particularly at thicker layering, for example in multiple applications or spray coating.

JP-A 56-155040 discloses glass frits based on a borosilicate glass containing 20 to 60 weight % $SiO_2$, 10 to 30 weight % $B_2O_3$, 10 to 30 weight % $Na_2O$, 1 to 15 weight % $K_2O$, 1 to 10 weight % $Li_2O$, 1 to 15 weight % ZnO and 1 to 15 weight % $TiO_2$. A content of $Li_2O$ is stringently prescribed, which brings with it the above disadvantages. In this document, combined use of fluorine in the frit mix is advised against due to the danger associated with it.

DESCRIPTION OF THE INVENTION

Accordingly, the objective of the existing invention is to provide a new glass composition, particularly in the form of a glass frit, which is better suited than the previous systems for the manufacture of glosses, enamels, particularly glass-enamels for architectural and instrument glass, and other ceramic decorative overlays, which can be applied without crack formation especially at low bake temperature and which exhibits good acid resistance. The bake zone in a 3 to 5 minute bake should lie between 600° and less than 650° C. The new glass composition is essentially free of lead, cadmium, lithium and $P_2O_5$ and should not require the presence of expensive $Bi_2O_3$ thus avoiding the previously illustrated detrimental influences of this element.

The objective is met with a glass composition containing in mole percent:

| | |
|---|---|
| $Na_2O$ | 10–15 |
| $K_2O$ | 0.1–2 |
| $Li_2O$ | less than 0.5 |
| $SiO_2$ | 40–50 |
| $B_2O_3$ | 8–12 |
| $TiO_2$ | 4–7 |
| $Al_2O_3$ | 0.1–3 |
| ZnO | 13–17 |
| F | 1–5 | and less than 0.5 weight % oxides of the series PbO, CdO, $P_2O_5$, and alkaline earth metal oxides.

Preferably, the glass composition should contain less than 0.1 mole % $Li_2O$, i.e., essentially no $Li_2O$. Appropriately, the composition contains less that 5 weight % of metal oxides other than those given previously. A preferred glass composition consists essentially of in mole percent:

| | |
|---|---|
| $Na_2O$ | 10–14 |
| $K_2O$ | 0.5–2 |
| $SiO_2$ | 40–50 |
| $B_2O_3$ | 8–12 |
| $TiO_2$ | 4–7 |
| $Al_2O_3$ | 0.5–2 |
| ZnO | 13–17 |
| F | 1–5 |

An especially preferred glass composition consists of in mole percent:

| | |
|---|---|
| $Na_2O$ | 11–14 |
| $K_2O$ | 1–2 |
| $SiO_2$ | 40–45 |
| $B_2O_3$ | 9–11 |
| $TiO_2$ | 4–7 |
| $Al_2O_3$ | 1–2 |
| ZnO | 14–16 |
| F | 1–3 |

Usually, the transformation point, $T_g$, measured by the DSC method (Differential Scanning Calorimetry), lies below 500° C. and the softening point $T_{EP}$ lies below 600° C.

As illustrated previously, the frit according to the invention is based on a glass composition containing $Na_2O$, $K_2O$, $SiO_2$, $B_2O_3$, $TiO_2$, $Al_2O_3$, and ZnO, wherein, besides oxygen, fluorine is also contained in the glass matrix as an anionic component. It is further significant to the invention that the frit be essentially free of $Li_2O$, PbO, CdO, $P_2O_5$ as well as alkaline earth metal oxides. Small fractions (less that 0.5 weight %) of undesirable oxides can, on the one hand, lead to contamination of the raw material for glass manufacture and, on the other hand, can find its way into the new glass composition from residual amounts of glass in the associated melt oven which contains any of this undesired material. Preferably, the content of these undesired oxides is held as low as possible; preferably, the presence of these oxides is eliminated completely.

Appropriately, the glass composition exists in the form of a glass frit. Glass frits can be obtained in known fashion, in which the necessary raw materials are melted together with a molar composition essentially corresponding to the composition of the glass frit to be produced, the melt is chilled, perhaps by free flow of a melt stream in water, and the brittle material thus obtained is ground. Typically, $Na_2O$ and $K_2O$ in the form of an oxide-forming raw material, mainly as a carbonate or entirely or partially as a fluoride, are employed as the raw materials for manufacture of the glass frit according to the invention. Appropriately, $Al_2O_3$ is added to the glass mix as non-aqueous alumina and/or as cryolite, $B_2O_3$ as boric acid and/or alkali metal borate, and ZnO, $TiO_2$, and $SiO_2$ in the oxide form.

To establish the desired fluorine content, this element is added to the frit in excess compared to the desired amount, typically in excess by one or more times, particularly 1 to 3 times, in the form of a fluoride. Fluorine is expelled during the glass melt partially as HF and/or in other forms. In order to adhere to the requirements for environmental protection and industrial hygiene, the glass melt oven is equipped with an effective fluorine absorption apparatus. Using non-aqueous raw materials and fluorides from the series NaF, KF, $ZnF_2$, $Na_3AlF_6$, the fluoride release is minimal.

The following is a discussion of the essential functioning of the main components of the composition of the glass frit:

Typically, only sodium oxide and calcium oxide are present as alkali components in the glass composition. By partial substitution of $Na_2O$ by $K_2O$, a significant drop in the melting point arises (colligative effects). The melting point can be lowered by increasing the alkali content to more than 17 mole %, however, the thermal expansion coefficient increases to an undesirable degree, intolerable for building glass uses. The $K_2O$ amount is limited, since it leads to undesirable crystallization effects at a nominal increase above 2 mole %. The sum of $Na_2O$ and $K_2O$ lies preferably between about 13 and 15 mole %. The melting point of the frit sinks with boric acid, however an undesired deterioration of the acid resistance arises when combined with simultaneously present zinc oxide in amounts over 12 mole %. With reference to good acid resistance, the ZnO content is also held within a tight boundary. The presence of titanium dioxide increases the acid resistance. Surprisingly, the glass frit melts homogeneously with the glass composition according to the invention despite the titanium dioxide content and without any prior crystallization effects. $SiO_2$ serves as a glass former; a content less that 40 mole % $SiO_2$ leads to an undesired drop in the acid resistance, a content over 50 mole % leads to a melting point increase. Aluminum oxide is contained in small amounts as an obligatory component for the increase of the chemical resistance; the melting point would be raised too much with a larger amount. Bismuth oxide, which on one hand increases the chemical resistance, and on the other reduces the melting point, can be present, but is not necessary; for cost reasons use of $Bi_2O_3$ is avoided. For reduction of the melting point of the glass frit and lowering of the bake temperature, an F-content as high as possible in the glass composition is preferred within the range according to the disclosure. At too high an F-content, the chemical resistance can drop and the glass frit can become turbid. In the glass mixture, preferably 5 to 10 mole % fluorine per mole % of the glass is added.

The glass frits according to the invention melt to form a non-porous glass layer. After the actual melt process, no crystallization effects or turbidization arises, which is important when considering the usefulness of the glass frits in brilliant glass dyes for the building glass sector. The melt behavior of the glass frits can be determined using DSC (Differential Scanning Calorimetry): According to this, the transformation point, $T_g$, lies generally below 500° C., mostly between 470° and 490° C.; the softening point $T_{EP}$ (endset) lies below 600°, mainly between 560° and 590° C. In practice, the minimum melting temperature is of greater importance: the minimum baking temperature $T_s$ of glass frits preferred according to the invention lies below 640° C., preferably in the between 600° and 630° C. at a 3 to 5 minute bake. The minimum melting temperature $T_s$ is determined in the 3 minute bake on glass as the substrate for example, where the pore freedom of the molten glass frit baked with the glass is referred to as the judgement criterion. Particular preferred glass frits bake well in 3 minute bakes at 620° to 630° C. Depending on use, if a lower minimum melting temperature is desired it can be achieved in that case, taking into account a reduced acid resistance or higher costs, by using a mixture of a glass frit according to the invention and a previously known lead-free glass frit with lower melting temperature.

It has become possible, through the materials chosen and the narrow range of compositions of the glass frits according to the invention, to obtain glass-enamel decorations which exhibit good acid resistance against 3 weight % hydrochloric acid as well as a very good base resistance against 10 weight % NaOH at room temperature after 5 minutes of exposure time. With the establishment of a 5-level grading scale (1=dissolved, 2=abrades easily, 3=matte, 4=weak effect, 5=no effect), baked glass frits according to the invention can be assigned an acid resistance mainly around 4 and they always have a base resistance of 5.

On the basis of the unexpectedly favorable properties of the glass composition according to the invention, glass frits with this composition lend themselves very well for the manufacture of glass-enamels and other ceramic decorations. For these purposes, dye preparations are employed which contain at least one glass frit and at least one inorganic ceramic dye pigment and/or dye frit. A dye preparation according to the invention is accordingly characterized by the content of a glass frit according to the invention. A preferred dye preparation contains: one or more glass frits according to the invention in an amount of 35 to 97 weight %, one or more dye pigments in an amount of 3 to 30 weight % and one or more other lead-free glass frits in an amount of 0 to 35 weight % such as have been described previously. The known oxide, sulfide, and nitride dye pigments are suitable as the dye pigments as long as they are stable within the baking conditions. In glass plates for the building glass sector, oxide pigments are preferred, particularly those based on the spinel structure.

The dye preparations can be applied onto the substrate in a dry application or preferably in the form of a dye paste using a conventional medium by employing a spray, pour, or screen-print application. The dye paste contains the appropriate amount of a dye preparation described previously and has a consistancy for spraying, pouring or screen-printing. A conventional medium is used for the production of the dye paste. Screen printing media essentially contain a suitable liquid organic, aqueous organic, or aqueous solvent for the suspension of the solids, a polymeric organic binder and aids as required for the establishment of the rheological properties of the paste as well as for the acceleration of the drying after printing.

In producing the glass-enamel or other ceramic decoration on the bakeable substrate, the baking at a temperature adjusted to the substrate follows the coating of a layer of the enamel- or decoration-forming composition onto the substrate.

For production of enamelled plates for the building glass sector, the dye is applied typically in a screen printing, spraying, or pouring process; after drying, the baking takes place during the normal tempering process. The good melting and baking behavior as well as the practically non-existent danger of crystallization under normal conditions of glass frits according to the invention make their use possible for producing glass-enamel coatings on architectural glass and instrument glass substrates with a thickness in the range, respectively, of generally 6 to 12 mm and 3 to 12 mm. The wet layer thickness of a glass-enamel decoration on building glass lies often at around 200 μm so that in this case an even melt-through of the glass frit must be assured within a few minutes. With the Li freedom of the glass frit, no ion exchange occurs with the substrate glass and as a result no build-up of stress, and no danger of crack formation arises in the decoration.

The glass composition according to the invention as well as the items produced with it possess outstanding properties: They are essentially free of lead and cadmium which is important for environmental and toxicological reasons. As a result of the generally complete absence of lithium compounds, no danger of crack formation in the decoration or reduction of the break strength of the enamelled glass plates with the glass composition arises. Since the glass composition according to the invention contains no bismuth oxide as a rule, it requires no use of expensive bismuth oxide. Using the glass composition, produced glass-enamels exhibit an excellent non-porous melt behavior. Although use of fluorine is not advised in JP-A 56-155040, referred to above, surprising improvements were made in the properties of the glass frit with respect to the melting and baking behavior by incorporation of fluorine into the glass structure. Finally, the good acid resistance of the glass-enamel or ceramic decorations using the glass composition according to the invention is mentionable.

EXAMPLES B1 TO B5 AND COMPARISON EXAMPLES VB1 TO VB5

A few batch compositions (in mole%) for of invention related and non-invention related frits for melting are tabulated in the following table: Moreover, the table contains measured properties: Transformation point $T_g$ and softening point $T_{EP}$ by means of the DSC method, minimum melting temperature $T_s$ at a 3-minute bake on glass as well as the acid resistance (SB) of the baked dyes against 3% HCl at room temperature after 5 minutes of exposure time (5-level grading scale: 1=dissolved, 2=abrades easily, 3=matte, 4=weak effect, 5=no effect). The following raw materials were added: soda, potash, alumina and/or cryolite, zinc oxide, titanium dioxide, boric anhydride, silicic acid. The raw materials were melted at a temperature of about 1100° C., the melt was quenched by free flow in water.

TABLE

| Batch | Comparison Examples (VB) | | | | | Examples (B) | | | | |
|---|---|---|---|---|---|---|---|---|---|---|
| Composition Fraction (Mol %) | 1 | 2 | 3 | 4 | 5 | 1 | 2 | 3 | 4 | 5 |
| $Li_2O$ | 11.4 | 0 | 5.2 | 0 | 0 | 0 | 0 | 0 | 0 | 0 |
| $Na_2O$ | 8.9 | 14 | 11.6 | 13.0 | 12.3 | 12.8 | 12.9 | 13.2 | 13.2 | 12.7 |
| $K_2O$ | 0 | 0 | 0 | 2.0 | 2.8 | 1.7 | 1.9 | 1.9 | 2.0 | 1.7 |
| Mgo | 0.8 | 0 | 0 | 0 | 0 | 0 | 0 | 0 | 0 | 0 |
| ZnO | 12.1 | 15.2 | 11.7 | 17.0 | 16.0 | 14.9 | 15.6 | 19.1 | 14.0 | 14.0 |
| $B_2O_3$ | 9.7 | 11.7 | 9.5 | 12.0 | 11.3 | 10.2 | 11.0 | 14.3 | 11.3 | 10.0 |
| $Al_2O_3$ | 1.8 | 1.8 | 1.7 | 1.5 | 1.4 | 1.5 | 1.6 | 1.6 | 1.4 | 1.6 |
| $SiO_2$ | 50.3 | 50.2 | 48.7 | 45.0 | 41.5 | 43.4 | 43.2 | 40.1 | 44.0 | 44.0 |
| $TiO_2$ | 5.0 | 7.1 | 5.8 | 9.5 | 9.0 | 5.8 | 6.0 | 4.1 | 6.1 | 6.0 |
| $Bi_2O_3$ | 0 | 0 | 0 | 0 | 0 | 0 | 0 | 0 | 2.0 | 0 |
| F | 0 | 0 | 5.8 | 0 | 5.7 | 9.6 | 7.8 | 5.7 | 6.0 | 10.0 |
| SB | 4 | n.b. | 4 | 4 | 3 | 4 | 4 | 3 | 3 | 4 |
| $T_g$ (°C.) | 478 | 532 | 472 | 522 | 496 | 480 | 489 | 485 | 482 | 484 |
| $T_{EP}$ (°C.) | 573 | 629 | 567 | 604 | n.b. | 576 | 585 | 573 | 574 | 580 |
| $T_s$/3 Min. (°C.) | 620 | 680 | 620 | 660 | 630 | 620 | 630 | 620 | 630 | 620 |
| Notes | R+ | | Ro | K | K | | | | | |

R = Cracks (+ = major, o = measurable)
K = crystallization
n.b. = not determined VB1 and VB3 show that Li-containing frits indeed lead to a sufficiently low $T_{EP}$ value. However, the more or less strongly exhibited crack formation is not consistant with the demand for quality for enamelled glass frits in building glass. Fluorine-free and Li-free frits according to VB2 and VB4 do not achieve the required minimum melting temperature $T_s$. At higher $TiO_2$ content, the tendency towards crystallization increases (VB4). With fluorine addition, the $T_s$ value drops, however crystallization still arises at 9 mole-% $TiO_2$ (VB5). Altogether, glass frits according to the invention (B1 to B5) exhibit the required melt behavior and a satisfactory to good acid resistance value of 3 to 4. A $Bi_2O_3$ addition (B4) causes no discernable change in properties.

EXAMPLE 6

Production of a black enamel layer on 6 mm strong architectural glass. The process is carried out in the following manner:

The raw materials were mixed:
61 kg frit according to Example B1, finely ground ($d_{50}$~5 μm)
11 kg black stain: CuCr—Spinel (Cerdec 24052)
28 kg screen-print medium (Cerdec 80858)

Frit, dye powder, and medium were mixed with a conventional tumbler to a paste and homogenized on a three-roll mill.

The print viscosity of approximately 9 Pa.s is achieved by addition of another medium.

The screen-printable paste was applied with a screen printing machine using polyester fabric with 43 threads per cm onto prepared 6 mm glass plates. The wet layer thickness measured approximately 37 μm.

The drying was carried out with an IR industrial dryer.

The baking was carried out in an industrial roller oven with a glass temperature of 635° C.

The baked enamel exhibited a dark glazed, completely crack-free surface and had an acid resistance of 4 and a base resistance of 5.

What is claimed is:

1. A glass composition consisting essentially of, in mole %:

| | |
|---|---|
| $Na_2O$ | 10–15 |
| $K_2O$ | 0.1–2 |
| $SiO_2$ | 40–50 |
| $B_2O_3$ | 8–12 |
| $TiO_2$ | 4–7 |
| $Al_2O_3$ | 0.1–3 |
| ZnO | 13–17 |
| F | 1–5 | said composition having less than 0.5 weight % oxides of the series PbO, CdO, $P_2O_5$, and alkaline earth metal oxides.

2. A glass composition according to claim 1, consisting essentially of the following components in mole %:

| | |
|---|---|
| $Na_2O$ | 10–14 |
| $K_2O$ | 0.5–2 |
| $SiO_2$ | 40–50 |
| $B_2O_3$ | 8–12 |
| $TiO_2$ | 4–7 |
| $Al_2O_3$ | 0.5–2 |
| ZnO | 13–17 |
| F | 1–5. |

3. A glass composition according to claim 2, consisting essentially of the following components in mole %:

| | |
|---|---|
| $Na_2O$ | 11–14 |
| $K_2O$ | 1–2 |
| $SiO_2$ | 40–45 |
| $B_2O_3$ | 9–11 |
| $TiO_2$ | 4–7 |
| $Al_2O_3$ | 1–2 |
| ZnO | 14–16 |
| F | 1–3. |

4. A glass frit, wherein the composition of the glass is as defined in claim 1.

5. A glass frit, wherein the composition of the glass consists essentially of the following components in mole %:

| | |
|---|---|
| $Na_2O$ | 11–14 |
| $K_2O$ | 1–2 |
| $SiO_2$ | 40–45 |
| $B_2O_3$ | 9–11 |
| $TiO_2$ | 4–7 |
| $Al_2O_3$ | 1–2 |
| ZnO | 14–16 |
| F | 1–3. |

6. A glass frit according to claim 4, wherein the minimum melting temperature of said frit lies between 600° and 630° C. in a 3-minute bake.

7. A glass frit according to claim 5, wherein the minimum melting temperature of said frit lies between 600° and 630° C. in a 3-minute bake.

* * * * *